United States Patent Office 3,066,708
Patented Dec. 4, 1962

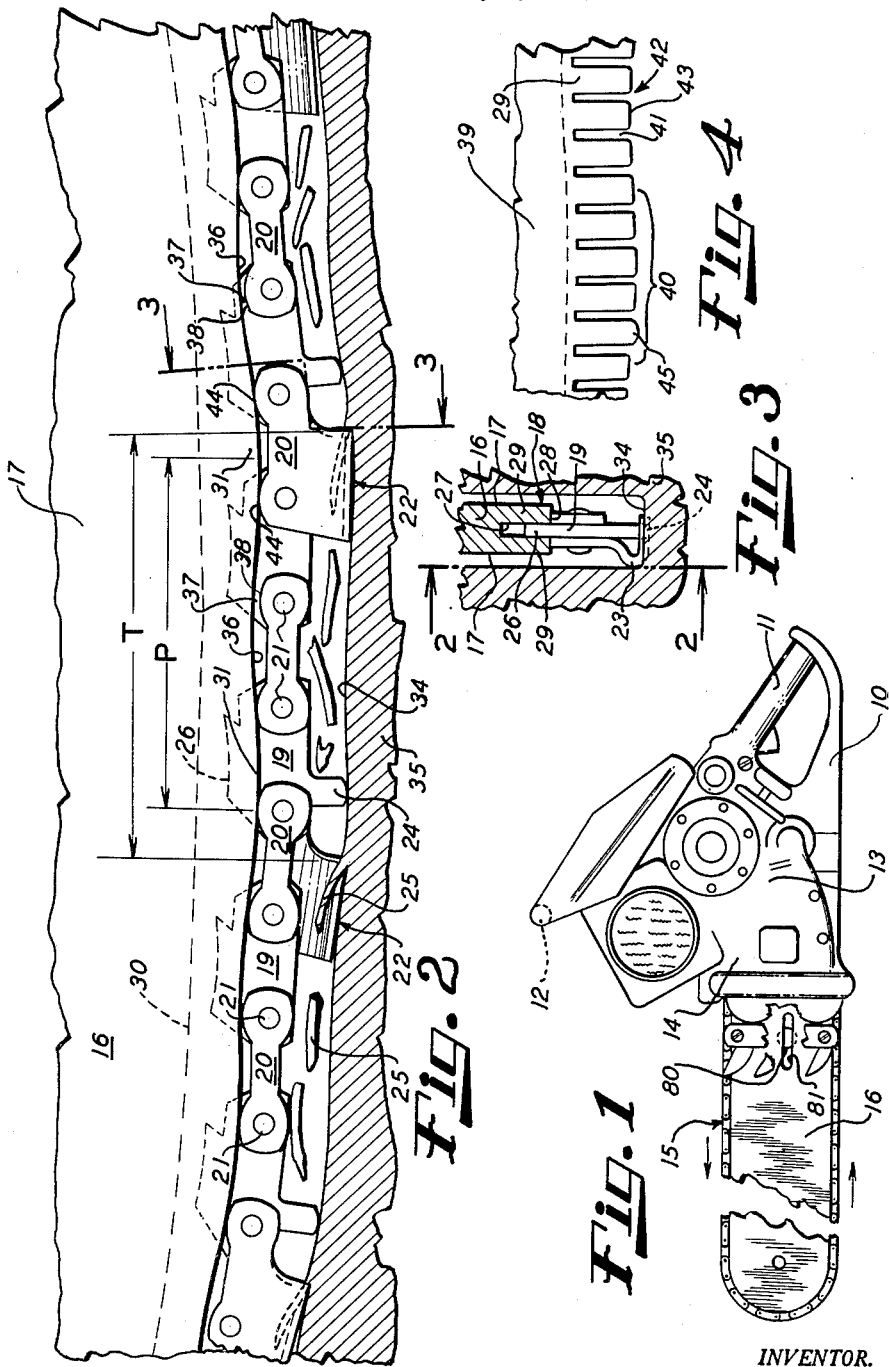

3,066,708
CHAIN SAW GUIDE BAR
William W. Haefliger, 1372 Alpine, San Marino, Pasadena, Calif.
Filed July 5, 1960, Ser. No. 40,869
6 Claims. (Cl. 143—32)

This invention relates generally to the chain saw art, and more particularly concerns improvements in supports for saw chains having for their purpose the improvement of saw chain operation to cut wood.

At the present time saw chain supports known as chain bars are formed to guide an endless saw chain along the edge of the bar in a uniform manner and without interruption. For example, an elongated saw bar in the form of a plate typically has a way or track at the bar edge, and extending along that edge of the bar which is to be presented to the wood work. One reason for so designing saw bars is to cause the chain cutters to present themselves in like manner or uniformly to the work; however, it is known that saw chains running on saw bars of this conventional type are subject to grabbing or binding in cuts or kerfs formed in the work when the chain cutters become dull, or alternatively have been incorrectly sharpened, particularly as respects the angle of sharpening and also the extent of vertical clearance between the forward edge of a cutter and the outward extremity of a depth gauge which precedes the cutting edge during chain travel. Such grabbing or binding leads to roughness of the chain which is felt by the operator holding the saw, and to slowing of the rate of cutting, ultimately requiring sharpening of the chain cutters as by filing them by hand or by power sharpeners. Much time is taken up by so sharpening the chain, and in the woods it is inconvenient to interrupt cutting of logs in order to sharpen the chain, so that the operator often puts up with a dull chain and accepts a necessarily reduced cutting rate and lost cutting time.

The present invention has among its major objects to provide a novel chain support or bar, and also a novel saw bar and chain combination, the operation and performance thereof being improved in certain important respects. Thus, it is contemplated that a chain operating on a bar of the present invention will be subject to such repeated engagement and disengagement with the bar as will benefit the overall performance of the chain especially as regards its cutting characteristics. For example, it is contemplated that a given chain operating on a bar of the present invention will have less tendency to grab or bind in a kerf as compared with the operation of the same chain on a conventional bar, and as a result, the operator in the woods need resort to sharpening of his chain at less frequent intervals, and the rate of cutting with a given chain will diminish over the period of use of the chain less rapidly than when a conventional chain bar or support is used.

As broadly conceived, that part of the invention having to do with the chain bar or support is found in the provision of an outwardly presented way for guiding the chain to travel along the support, the way including outward projections located at intervals along the edge of the support or bar so that the chain successively engages the projections during its travel along the way or track. Typically, the projections will be located at regular intervals along the edge of the support, and in one of its forms the way has serpentine configuration in the plane of the bar so that the chain cutters are forced to undergo movement relatively toward and away from the work as determined by the relative positions of the cutters along the way, all in response to chain travel in contact with the way and the wood work. Thus, the chain cutters are caused in passing over the projections to move outwardly toward the work even though the cutters are dull, whereas in passing over the spaces between the outward projections the cutters are at least to some extent relieved by the bar permitting inward movement of the cutters toward the bar and relatively away from the work. Accordingly, the cutting effect of the cutters varies with their respective position along the way.

The effect of alternately urging the cutters outwardly toward the work and relieving such outward pressure, the frequency of which alternation varies with chain speed, may be considered of advantage in that the available power transmitted by the chain is utilized to greater and lesser extent by different of the cutters presented to the work as compared with relatively equal utilization of power delivered to a greater number of active cutters traveling along a conventional bar. For example, it typically may happen that six cutters travel along a conventional bar and in similar active cutting engagement with the work, whereby if six horsepower is delivered to the six cutters it is contemplated that each cutter will have available to it about one horsepower. Upon dulling of the cutters of such a chain, the one horsepower delivered to each cutter becomes expectably insufficient to prevent roughness, grabbing or binding of the cutter in the work, leading to reduced cutting rates. If, however, the power delivered to such cutters is increased, as for example to two horsepower per cutter, then the effect of dullness may be considered less pronounced in contributing to grabbing and binding the chain.

In accordance with the present invention, it may be supposed that the projections on the saw bar cause active cutting at any given time by half, or three of the cutters presented to the work, whereby six horsepower delivered to the chain is concentrated in the average amount of about two horsepower per cutter, leading to diminishing of the adverse effects due to dulling of the cutters mentioned above. In other words, by concentrating the available power at fewer cutters at any given time, the advantages of a larger size engine delivering greater horsepower to the chain may be realized without the provision of such a larger size engine. This is clearly an advantage in terms of weight saving and greater use of the chain between sharpenings leading to more efficient operation. Also, since the total number of cutters in use over an extended period of time is not diminished, the invention realizes the slower dulling rate advantages of a chain having a large number of cutters, as well as the reduced roughness advantages of a chain having fewer cutters. Of course the horsepower delivered to the chain cutters will depend upon the output of the engine, and the number of cutters presented to the work will depend upon the chain design and the size of the work or logs to be cut, so that the invention is not to be limited to any particular number of chain cutters or power delivery thereto.

In another of its forms the invention contemplates the provision of slots extending inwardly into the chain support or bar from the edge thereof, and located between the projections. One effect of such slots is seen to be the reduction in frictional drag imposed on the chain by rubbing of the chain links against the surface of the way or track which is interrupted by such slots. Also, a beneficial rapid pulsing of the cutters is thereby achieved in response to running of the chain over the alternate projections and slots, promoting the cutting of smaller chips by the cutters and reducing the clogging effect of larger chips in the kerf.

These and other objects and advantages of the invention, as well as the details of an illustrative embodiment, will be more fully understood from the following detailed description of the drawings, in which:

FIG. 1 is a side elevation showing a typical chain saw in outline;

FIG. 2 is an enlarged fragmentary vertical section showing a saw chain running along a saw bar or support of the present invention, and in cutting engagement with the work;

FIG. 3 is a section taken on line 3—3 of FIG. 2; and

FIG. 4 is a fragmentary side elevation showing a modified form of the bar.

Referring first to FIG. 1, the chain saw illustrated includes a frame 10 having hand grips 11 and 12 supporting an engine generally indicated at 13. The latter drives a transmission enclosed within a housing 14, for driving the chain 15 running along an elongated support or bar 16, the chain being operable to effect cutting of wood work.

The longitudinally elongated bar 16 of the present invention is in the form of a plate having opposite flat sides 17 and an outwardly presented way generally indicated at 18 for guiding the chain to travel along the support at the edge thereof as the chain is driven by the engine and transmission. The bar may be shifted longitudinally relative to the frame 10 after loosening of the clamping mechanism shown generally at 80 to extend through a bar slot 81, such adjustment serving to tighten or loosen the chain running on the bar.

The chain in FIG. 2 is shown to include a longitudinal series of center links 19 and side links 20 interconnected by rivets 21 as shown. Certain of the side links include integral cutters 22 in the form of plates projecting outwardly and sidewardly at 23 and then back over the longitudinal plane of the center links 19 at 24 as best seen in FIG. 3. The cutters are typically located at regular intervals along the chain and on left and right side links 20, as illustrated, the pitch interval between successive cutters being typically measured as between the cutter forward edges as indicated at "T." While only one form of chain is illustrated in the drawings, it will be understood that the chains may take different forms in conformance with the teachings of the invention. The depth of cuts made by the cutters 22 is controlled by depth gauges 24 typically integral with the center links 19 immediately preceding the cutters in their direction of travel, the chips cut by the cutters being shown at 25. Also, the center links have tails 26 which travel along in the longitudinal groove 27 sunk inwardly from the outer edge or surface 28 of the way 18. As a result, way flanges are formed at 29 at opposite sides of the groove 27.

Referring now to the chain support or bar construction, it is shown in FIG. 2 to have basic way curvature or convexity along the length of the bar, the broken line 30 indicating the bottom of the groove 27 also indicating such convex curvature. The way 18 also includes outward or peripheral projections 31 located at intervals along the edge of the support to be successively engaged by the chain side links 20 during travel thereof along the way. Typically, the projections are located at regular intervals along the way 18, as indicated by the dimension "P" taken between the outer extremities of two successive projections 31, this dimension being considerably greater than the dimension between successive rivets 21 interconnecting the center and side links. Also, the dimension "P" is somewhat less than the dimension "T," i.e. the ratio of "P" to "T" is less than unity, so that all the cutters 22 do not pass simultaneously over projections 31. This same effect may be obtained by making the ratio of "P" to "T" greater than unity. In other words, only certain of the cutters 22 traveling in the kerf 34 of the wood work 35 will be positively urged outwardly relatively toward the bottom of the kerf at any given time, other cutters at this time passing over the spaces between the projections at which the way is relieved inwardly as indicated at 36, and thereby relieved of constraint imposed by the way. It will be noted that the interval "T" between the cutting edges of successive cutters may be said to differ dimensionally from the interval, as for example the interval "P," between corresponding points on successive way projection outer extremities, so that the cutting edges of successive cutters respectively arrive over corresponding points on successive way projection outer extremities at slightly different times. The way 18 illustrated in FIG. 2 may be characterized as having serpentine configuration, whereby chain cutter movement inwardly and outwardly may be effected in response to chain travel in contact with the way and the work. The condition of decreased frictional drag on the side links 20 is illustrated in FIG. 2, by the gaps 37 between the inner edges 38 of the side links 20 and the inwardly recessed surface portions 36 of the way. These latter surface portions 36 are spaced inwardly from the locus of an outwardly convex line passing through the outer extremities of the projections 31, and paralleling groove bottom 30 in spaced relation thereto. Accordingly, the cutter links are free to adjust themselves to the kerf wood and the pulling action of the chain while the cutters are spaced from the way surface portions 36. In this regard, the tightness of the chain on the bar may be adjusted to allow the chain to be deflected to greater or lesser extent toward the inwardly recessed way portions 36, during cutting.

Referring now to FIG. 4, the chain support or bar 39 shown, has major outward projections 40 of the same serpentine configuration as described in connection with FIG. 2. Also, the bar flanges 29 have lateral slots 41 cut inwardly from the bar edge at intervals along the way 42. The slots 41 are sufficiently close together that the chain side links 20 adapted to slide along and over the way 42 have overall length substantially in excess of the slot length dimensions along the way 42. Accordingly, the frictional resistance of the links 20 along the surface of the way 42 is decreased by virtue of sliding of these links over the slots. Also, beneficial effect upon the cutting action of the cutters 22 is realized by virtue of the rapid engagement of the side links 20 to which the cutters are integral with the outer extremities 43 of the projections formed between the slots 41. This effect is derived from the rapid impacting of the side link edges 44 against the projection surfaces 43. Certain of the projections may have outwardly raised extremities at 45 located at intervals along the way 42 for imparting a rather sharp outward movement to the cutters especially during travel of the cutters over the serpentine projections 40.

While the invention has been described in relation to a chain, the cutters of which are integral with chain side links, it will be understood that the cutters may alternatively be made integral with the chain center links.

The invention possesses other advantages and has other objects which may be made more easily apparent from a consideration of the different embodiments of the invention; however, it is to be understood that the description of these embodiments is not to be taken in a limiting sense, since the scope of the invention is best defined by the appended claims.

I claim:

1. In a chain saw that includes a chain operable to effect cutting of wood work and means for driving the chain, the chain including cutters, the improvement that comprises an elongated chain support having an outwardly presented way for guiding the chain to travel along the support as the chain is driven by said means, said way including fixed outward projections located at intervals along the edge of the support to be successively engaged by the chain during travel thereof along said way, said way forming a groove to receive portions of the chain and said way at opposite sides of the groove being inwardly recessed between successive projections and to a depth less than the bottom depth of the groove, the interval between the cutting edges of successive cutters differing dimensionally from the interval between corresponding points on successive projection outer extremities so that the cutting edges of successive cutters respectively arrive over corresponding points on successive projection outer extremities at slightly different times.

2. In a chain saw that includes a chain operable to effect cutting of wood work and means for driving the chain, said chain including cutters, the improvement that comprises a forwardly elongated chain support having an outwardly presented way for guiding the chain to travel along the support at the edge thereof as the chain is driven by said means, the exposed surface of said way having shallow serpentine configuration and said way including fixed outward projections the outer extremities of which are located at intervals along the way, said outer extremities defining the locus of an outwardly convex line, whereby chain cutter movement relatively toward and away from the work may be effected in response to chain travel in contact with said way and the work, said way forming a groove to receive portions of the chain and said way at opposite sides of the groove being inwardly recessed between successive projections and to a depth less than the bottom depth of the groove, the interval between cutting edges of successive cutters being greater than the interval between corresponding points on successive way projection outer extremities.

3. In a chain saw, a chain operable to effect cutting of wood work as the chain is driven by power transmitting means, the chain including cutter links having cutting edges spaced at intervals along the chain, and an elongated chain support having an outwardly presented way for guiding the chain to travel along the support as the chain is driven by said means, said way including fixed outward projections the outer extremities of which are spaced at intervals along the edge of the support to be successively engaged by the chain during travel thereof along said way, said way forming a groove to receive portions of the chain and said way at opposite sides of the groove being inwardly recessed between successive projections and to a depth less than the bottom depth of the groove, the support containing slots extending inwardly into the support from the edge thereof, and the chain including links adapted to slide along and over said way and slots, said links having overall length substantially in excess of the slot dimensions along said way at the edge of the support, the interval between the cutting edges of successive cutting links being greater than the interval between corresponding points on successive way projection outer extremities.

4. For combination in a chain saw that includes an endless tensioned chain having cutters operable to effect cutting of wood work and means for driving the chain, the improvement that comprises an elongated chain support having an outwardly presented way for the tensioned chain to travel along as the chain is driven by said means, said way including laterally spaced flanges forming a groove for receiving portions of the chain, each flange including peripheral projections located at intervals therealong, the projections being located in such proximity in the direction of chain travel as to laterally confine said chain portions in continuous alignment with said groove during chain travel, each flange being fixed and inwardly recessed between successive projections and to a depth less than the bottom depth of the groove extent proximate said recess, the interval between cutting edges of successive cutters being greater than the interval between corresponding points on successive way projection outer extremities.

5. In combination with a longitudinally extending support for a power driven saw chain provided with cutters and including a succession of pivotally interconnected links certain of which are spaced apart in the direction of chain travel and are engageable with the outer edges of a pair of laterally spaced apart flanges integral with the support and forming a groove, others of said links having tails which are received in said groove as the chain travels along the support, means exerting force acting to keep the chain under tension during chain travel along the support, and other means integral with and forming peripheral extent of the support flanges for impacting said certain links at predetermined locations along said flanges and while traveling chain cutters are cutting wood, said other means including peripheral projections located at intervals along said flanges, the interval between the cutting edges of successive cutters differing dimensionally from the interval between corresponding points on successive projection outer extremities so that the cutting edges of successive cutters respectively arrive over corresponding points on successive projection outer extremities at slightly different times.

6. In a chain saw that includes an endless chain having cutters operable to effect cutting of wood work and means for driving the chain, the chain also including pivotally interconnected center links and side links, the improvement that comprises an elongated chain support having an outwardly presented way for the chain to travel along as the chain is driven by said means, said way including laterally spaced apart flanges forming a groove for receiving portions of said center links, said side links having terminal edges engageable with said flanges, said flanges being peripherally recessed at intervals therealong and away from said side links and said chain being tensioned so that said side link terminal edges are adapted to ride over said recesses to become temporarily free of engagement with said flanges thereby to reduce frictional sliding contact of the side links and flanges, said flanges forming projections located at intervals therealong, the interval between the cutting edges of successive cutters differing dimensionally from the interval between corresponding points on successive projection outer extremities so that the cutting edges of successive cutters respectively arrive over corresponding points on successive projection outer extremities at slightly different times.

References Cited in the file of this patent

UNITED STATES PATENTS

| 1,588,563 | Wilson | June 15, 1926 |
| 2,229,214 | Lacher | Jan. 21, 1941 |
| 2,947,331 | Irgens | Aug. 2, 1960 |

FOREIGN PATENTS

| 722,595 | France | Jan. 4, 1932 |
| 706,560 | Germany | May 29, 1941 |
| 150,736 | Austria | Sept. 25, 1937 |